UNITED STATES PATENT OFFICE.

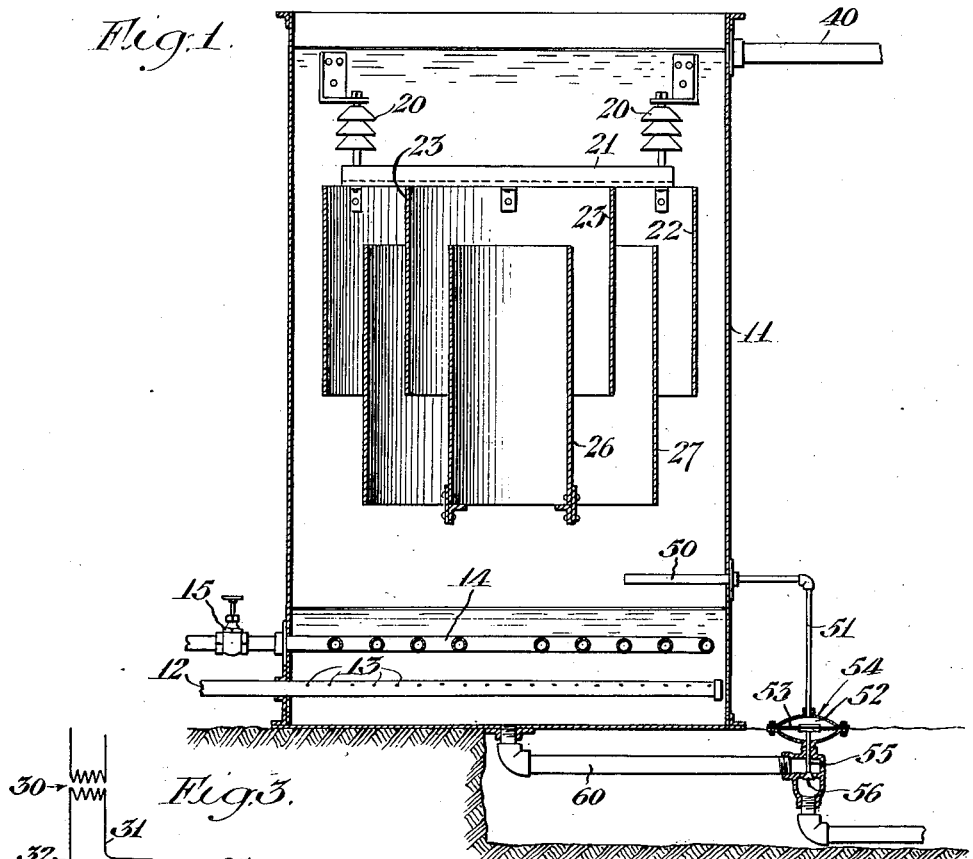
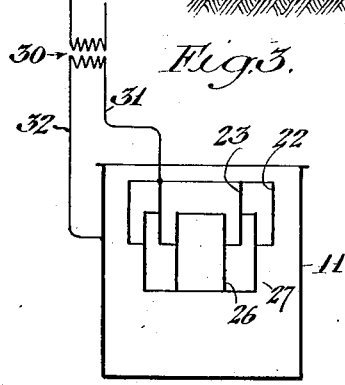
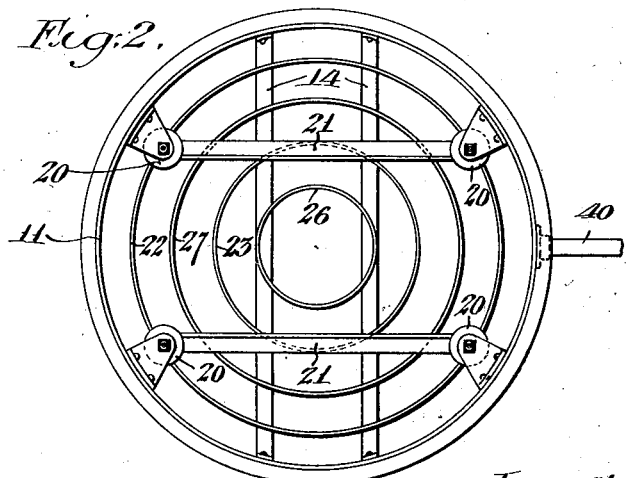

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

DEHYDRATOR FOR PETROLEUM EMULSIONS AND WATER-CONTROLLED SYSTEMS FOR SAME.

1,405,124. Specification of Letters Patent. Patented Jan. 31, 1922.

Application filed April 30, 1919, Serial No. 294,001. Renewed May 31, 1921. Serial No. 473,770.

*To all whom it may concern:*

Be it known that I, FORD W. HARRIS, a citizen of the United States, residing at Los Angeles, in the county of Los Angeles and State of California, have invented a new and useful Dehydrator for Petroleum Emulsions and Water-Control System for Same, of which the following is a specification.

My invention relates to dehydrators for petroleum oils. Crude petroleum as found in nature is often associated with water, this water being in the form of small particles which may arbitrarily be divided into "trapped" water and "free" water. The free water particles are of sufficiently large size to readily settle out by gravity, but the trapped water is in the form of very fine globules which require a very long time to settle. It is a well known fact that by subjecting petroleum emulsions to the action of an electric current that the trapped water globules will be agglomerated into larger masses which will readily settle out by gravity.

The object of the present invention is to provide means for subjecting the oil to electrical stresses and to provide means by which the apparatus will be automatically controlled.

Further objects and advantages will be made evident hereinafter.

Referring to the drawings, which are for illustrative purposes only,

Fig. 1 is a section through a preferred form of dehydrator embodying my invention.

Fig. 2 is a plan view, and

Fig. 3 is a diagram of the same.

In the form of dehydrator shown in these drawings, a tank 11 is provided having an oil inlet pipe 12 in the bottom thereof, this pipe having small perforations 13 through which the oil is forced into the tank, and having a steam coil 14 controlled by a valve 15 immediately over the inlet pipe 12. Suspended on insulators 20 in the top of the tank are cross-members 21, these members having primary cylinders 22 and 23 secured therefrom. Cross-members 24 are secured to the side of the tank and support secondary cylinders 26 and 27. A transformer 30 has one terminal 31 of its secondary connected to the members 21, the other terminal 32 being connected to the tank and through the members 24 to the secondary plates 26 and 27. The plates 22, 23, 26 and 27 are cylinders concentrically located with relation to each other and with relation to the walls of the tank.

An oil outlet pipe 40 is provided near the top of the tank through which cleaned oil may be withdrawn. Projecting through the side of the tank is a closed cylinder 50 which contains a fluid boiling at any desired point, say 180 degrees Fahrenheit. This cylinder 50 is connected through a pipe 51 with a space 52 above a diaphragm 53 in a tight diaphragm chamber 54. This diaphragm is connected through a stem 55 with a valve 56. The valve 56 is placed in a water outlet pipe 60 and is so arranged that the valve 56 is closed at all times except when pressure is exerted on the diaphragm 53 due to the liquid in the cylinder 50 boiling, at which time the valve is open.

The method of operation of my invention is as follows:

The crude oil containing both free and trapped water is passed into the tank 11 through the pipe 12, the free water remaining in the bottom of the tank. The oil and emulsion tend to rise in the tank into the space between the plates 22 and 23 and 26 and 27. The space between these plates being subjected to an electric stress due to the transformer 30, the trapped water therein is agglomerated into larger masses which settle through the oil into the water in the bottom of the tank. This water is kept hot by the steam coils 15. I have found that where a body of petroleum oil is heated by a body of water that there is a considerable temperature difference at the point of contact; for example, if the water is maintained at 180 degrees Fahr. and the entering oil is delivered at a temperature of 120 degrees Fahr., the oil in the top of the tank may be 160 degrees and the oil directly above the water may be at a temperture of 130 degrees. Suppose that liquid in the cylinder 50 has the proper boiling point to produce a pressure at say 180 degrees Fahr. when operating under the above conditions. Then so long as the cylinder 50 is in the oil above the water the temperature is so low that the valve 56 remains closed. Whenever the hot water rises sufficiently to make contact with the cylinder 50 the liquid therein boils thus acting on the diaphragm 53 and the valve 56 opens, draining out water from the bottom of the tank. There is some time lag in the operation of the apparatus so that after sufficient water is drawn out to lower the level considerably below the cylinder 50 the valve still remains open. Eventually, however, cooler oil acting upon the thermostat closes the valve 56 and the cycle is repeated.

In practice the oil entering the treater through the pipe 12 is maintained at from 20 to 40 degrees Fahr. lower temperature than the water. As a consequence, circulation of oil takes place in and around the plates, the oil being heated by the water rising through the plates and then falling again along the walls of the tank.

I claim as my invention:—

1. A dehydrator comprising a tank in which are disposed concentric cylinders adapted to alternate electric polarity and open at their tops and bottoms, electric energizing means having one pole connected to a plurality of said cylinders and having the other pole connected to a plurality of other of said cylinders and insulated therefrom.

2. In a dehydrator a metallic tank in which are mounted a plurality of concentric cylinders electrically connected and grounded and another plurality of other cylinders alternately disposed between said first named cylinders, said other cylinders being electrically connected to one polarity of an energizing electrical circuit, and said energizing circuit the other pole of which is connected to ground, and insulating means between the plurality of first named cylinders and the plurality of other cylinders.

3. In a dehydrator as set forth in claim 2 a pipe outlet from said tank and a valve in said pipe and pressure controlled means whereby said valve is caused to open to discharge water that may accumulate at the bottom of said tank when the pressure on the valve reaches a predetermined amount.

4. In an electric dehydrator, a tank, electrodes formed of concentric cylinders arranged in two sets inside said tank, one set being supported from above and the other set being supported from below, and means for insulating one of said sets from said tank.

In testimony whereof, I have hereunto set my hand at Los Angeles, California, this 25th day of April, 1919.

FORD W. HARRIS.